(12) United States Patent
Kukai

(10) Patent No.: US 6,294,895 B1
(45) Date of Patent: Sep. 25, 2001

(54) POWER SUPPLY APPARATUS AND POWER SUPPLY CONTROLLING METHOD FOR USE WITH ELECTRONIC DEVICE

(75) Inventor: Toru Kukai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/636,721

(22) Filed: Aug. 11, 2000

(30) Foreign Application Priority Data

Aug. 11, 1999 (JP) .................................................. 11-227286

(51) Int. Cl.⁷ ........................................................ H02J 7/00
(52) U.S. Cl. ............................................. 320/132; 320/149
(58) Field of Search .................................... 320/107, 116, 320/132, 149; 324/426, 433

(56) References Cited

U.S. PATENT DOCUMENTS 5,712,795 * 1/1998 Layman et al. .
5,825,155 * 10/1998 Ito et al. .
5,870,685 * 2/1999 Flynn .

* cited by examiner

Primary Examiner—Edward H. Tso
(74) Attorney, Agent, or Firm—Jay H. Maioli

(57) ABSTRACT

A power supply apparatus for supplying power from a battery to a plurality of functional blocks of an electronic device includes a battery capacity assigning means for assigning battery capacities to the plurality of functional blocks, and a battery capacity managing means for managing the battery capacities of the plurality of functional blocks that operate corresponding to the battery capacities assigned to the plurality of functional blocks.

6 Claims, 7 Drawing Sheets

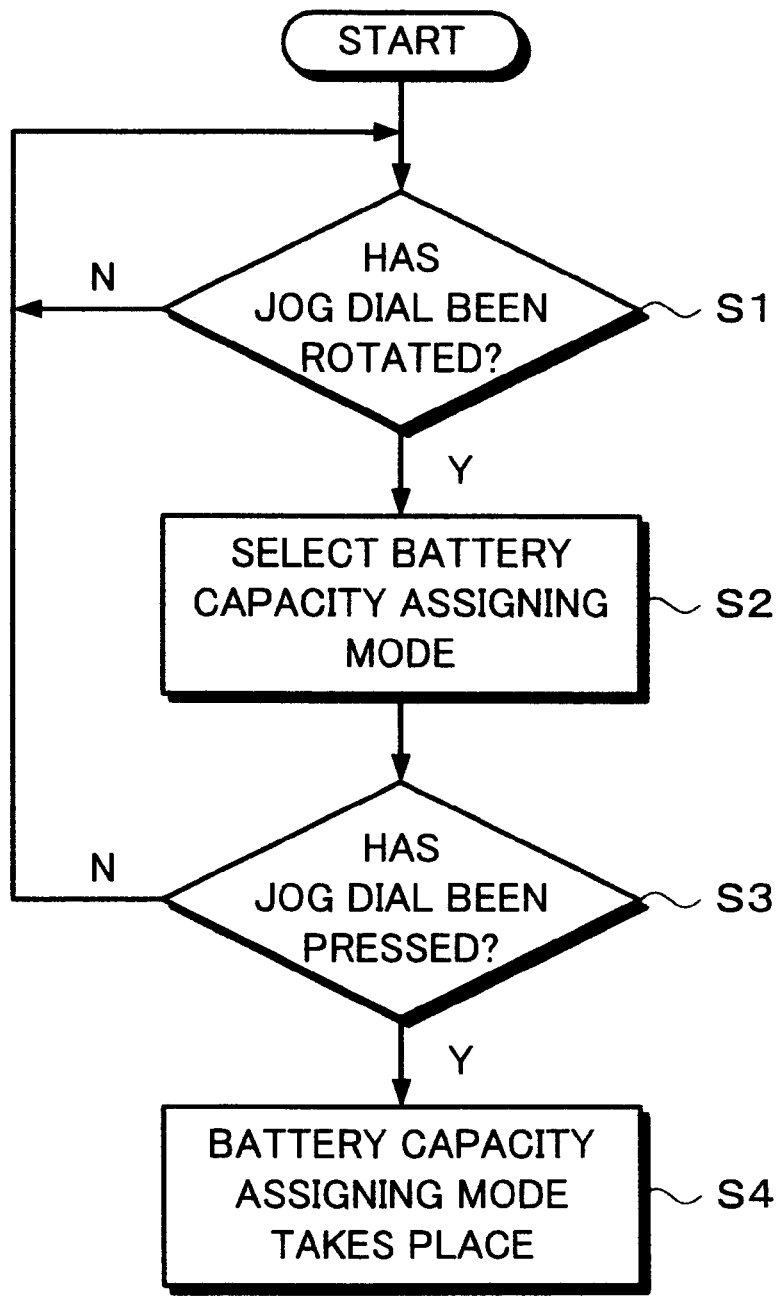

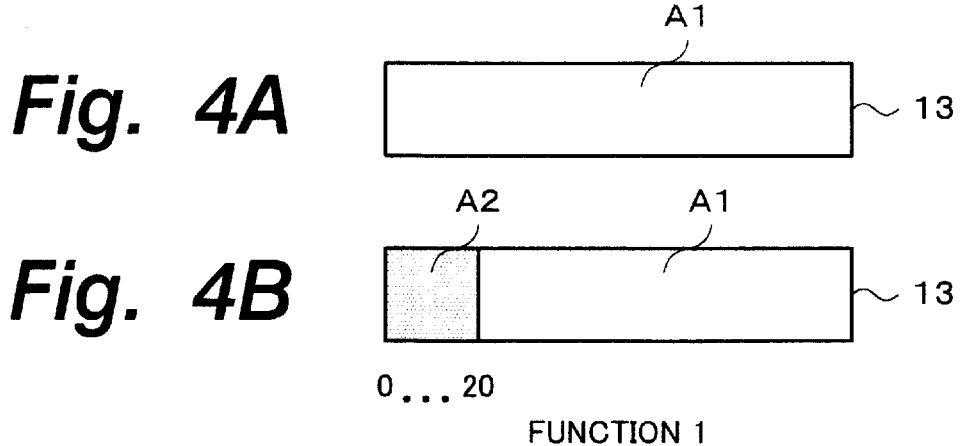
Fig. 4A
Fig. 4B
FUNCTION 1
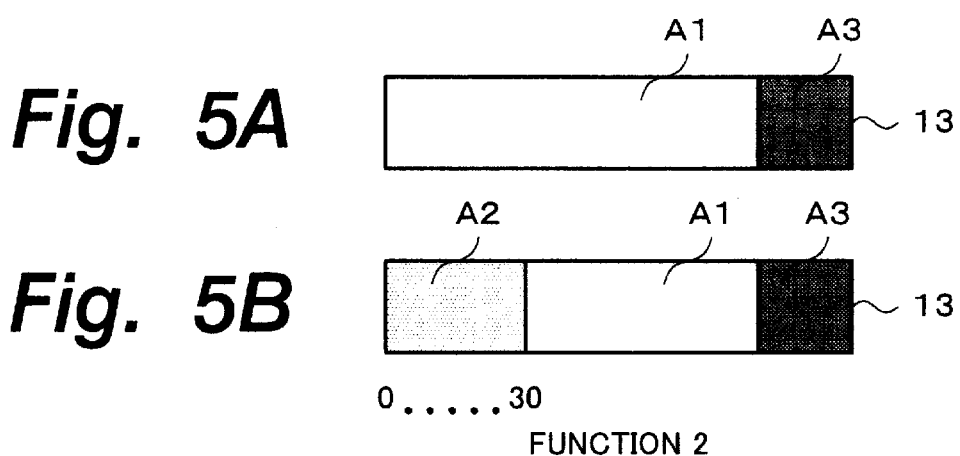
Fig. 5A
Fig. 5B
FUNCTION 2
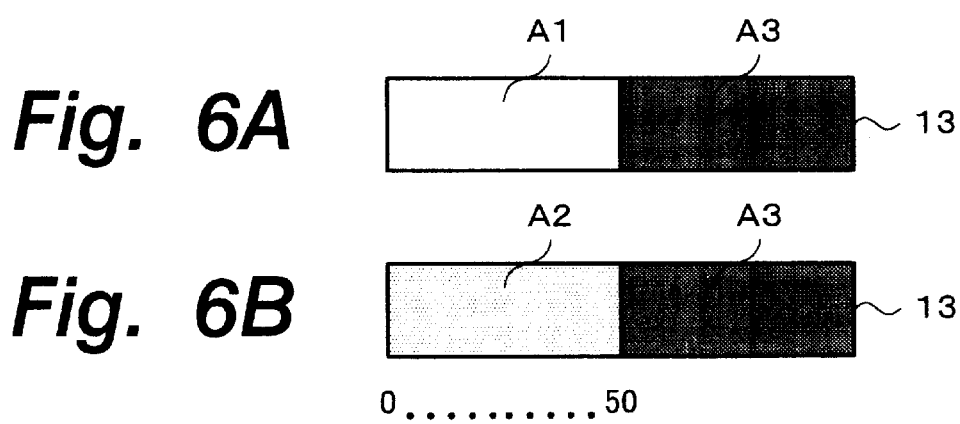
Fig. 6A
Fig. 6B

POWER SUPPLY APPARATUS AND POWER SUPPLY CONTROLLING METHOD FOR USE WITH ELECTRONIC DEVICE

BACKGROUND OF THE INVENTION

1. Field of the Invention

The present invention relates to a power supply apparatus and a power supply controlling method for use with a multi-function type electronic device that operates as a portable telephone, a GPS (Global Positioning System), and a music program reproducing player.

2. Description of the Related Art

There are many types of portable information terminal units referred to as PDA (Personal Digital Assistant) units. As PDA units, cellular type portable telephone units, simple type portable telephone units (for example, PHS: Personal Handy phone System units), portable personal computers and electronic handy note books are known. When a portable telephone is connected to a portable personal computer, an electronic mail can be sent and received. As other examples of PDA units, GPS terminal units and portable music program reproducing players are known. A GPS terminal unit detects signals from satellites and displays the current position of the unit on its display. A portable music program reproducing unit downloads a music program to a record memory that is attachable thereto and detachable therefrom and reproduces the downloaded music program.

As such various types of PDA units are becoming common, there may be many situations of which the user should carry them at a time.

To solve such inconvenient situations, multi-function type PDA units have been proposed. For example, a multi-function type portable information terminal unit having a portable telephone function (a conventional cellular telephone function or a PHS function), a GPS function for locating the current position, and a music program reproducing function for reproducing a downloaded music program has been proposed. With such a multi-function type portable information terminal unit, the user can conveniently and easily use such functions.

However, such a multi-function type portable information terminal unit has only one battery that supplies an electric power to a plurality of functional portions. Thus, when the user uses one function of the unit, if the power of the battery is consumed, the user cannot use another function.

For example, after the user has enjoyed a music program with the player function of the multiple-function type portable information terminal unit that has the telephone function, the GPS function, and the player function, when the user wants to use the telephone function, if the battery has been exhausted, the user cannot use the telephone function because sufficient power cannot be supplied. Thus, unless the user always checks for the remaining battery capacity, he or she may not use his or her desired function.

OBJECTS AND SUMMARY OF THE INVENTION

Therefore, an object of the present invention is to provide a power supply apparatus and a power supply controlling method for use with an electronic device that allow battery capacities to be separately assigned to a plurality of functions of the device.

Another object of the present invention is to provide a power supply apparatus and a power supply controlling method for use with an electronic device that allow battery capacities to be assigned to a plurality of functions corresponding to the frequencies in use and their current consumption.

A first aspect of the present invention is a power supply apparatus for supplying a power of a battery to a plurality of functional blocks of an electronic device that operate therewith, comprising a battery capacity assigning means for assigning battery capacities to the plurality of functional blocks, and a battery capacity managing means for managing the battery capacities of the plurality of functional blocks that operate corresponding to the battery capacities assigned to the lurality of functional blocks.

A second aspect of the present invention is a power supply controlling method for supplying a power of a battery to a plurality of functional blocks of an electronic device that operate therewith, comprising the steps of (a) assigning battery capacities to the plurality of functional blocks, and (b) managing the battery capacities of the plurality of functional blocks that operate corresponding to the battery capacities assigned to the plurality of functional blocks.

According to the present invention, battery capacities can be freely assigned to a plurality of functions of the unit. In addition, since the battery capacities assigned to the individual functions are always supervised and a message corresponding to a remaining battery capacity is issued to the user, all the capacity of the battery can be more effectively and rationally used. When a battery capacity assigned to one function remains, it can be assigned to another function. Thus, all the capacity of the battery can be effectively used. In addition, since a battery capacity can be freely assigned to a function designated by the user, the operability of the unit is improved.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a flow chart for explaining an assigning process according to the embodiment of the present invention;

FIGS. 4A and 4B are schematic diagrams for explaining an assigning operation for battery capacities according to the embodiment of the present invention;

FIGS. 5A and 5B are schematic diagrams for explaining the assigning operation for battery capacities according to the embodiment of the present invention;

FIGS. 6A and 6B are schematic diagrams for explaining the assigning operation for battery capacities according to the embodiment of the present invention;

DETAILED DESCRIPTION OF THE PREFERRED EMBODIMENTS

Next, with reference to the accompanying drawings, an embodiment of the present invention will be described. FIG.

1 is a schematic diagram showing an example of the structure of a portable information terminal unit according to the present invention. The portable information terminal unit 1 is a multi-function type portable information terminal unit having a GPS function, a player function for reproducing a music program, and a portable telephone function.

The portable information terminal unit 1 has a displaying portion 2. The displaying portion 2 displays various types of data corresponding to each function. For example, when the portable information terminal unit 1 is used as a portable telephone unit, the displaying portion 2 displays a telephone number, a message, and so forth. When the portable information terminal unit 1 is used as a GPS unit, the displaying portion 2 displays the latitude and the longitude of the current position of the unit and so forth. When the portable information terminal unit 1 is used as a music program reproducing player unit, the displaying portion 2 displays the program tile and the reproduction time period of a music program that is being reproduced and so forth.

The portable information terminal unit 1 has a keyboard 3. The keyboard 3 is composed of 10 numeric keys "0" to "9" and symbol keys "*" and "#". When the portable information terminal unit 1 is used as a portable telephone unit, the keyboard 3 is used to input a telephone number and so forth. When the portable information terminal unit 1 is used as a music program reproducing player unit, the keyboard 3 is used to input the title of a music program that user wants to reproduce. In addition, as will be described later, the keyboard 3 is used to assign battery capacities to individual functions.

A selection dial 4 (also referred to as jog dial) is disposed at an upper side position of the portable information terminal unit 1. When the user turns and presses the selection dial 4 at predetermined positions, he or she can designate various modes and operations of the portable information terminal unit 1.

Figure 2:
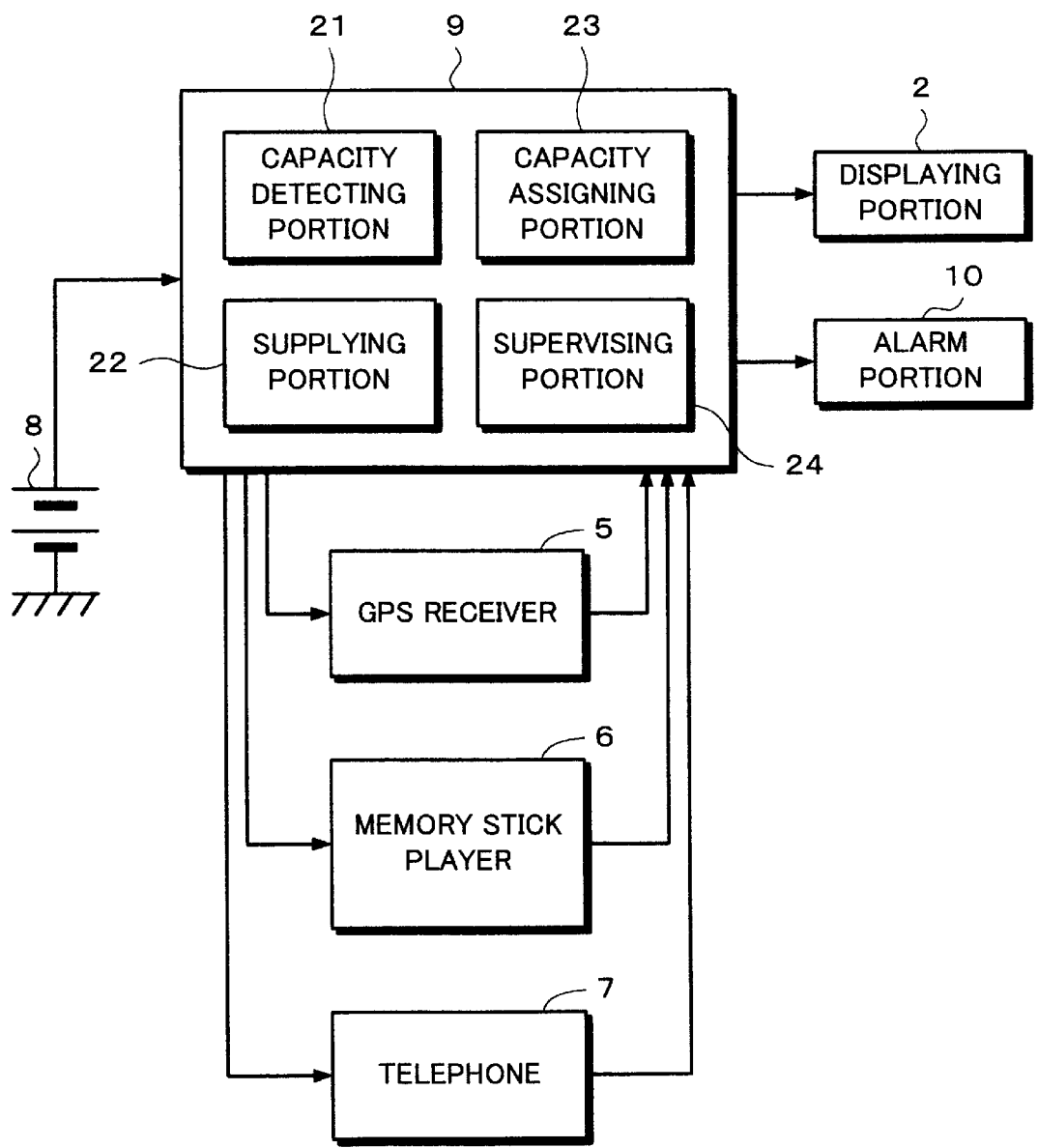
FIG. 2 is a block diagram showing the entire structure of the embodiment of the present invention.

The user can designate the portable information terminal unit 1 as a GPS function (function "1"), a player function for reproducing a music program (function "2"), and a portable telephone unit (function "3"). To accomplish these functions, the portable information terminal unit 1 has a GPS receiver portion 5, a player portion 6, and a telephone portion 7 as shown in FIG. 2.

The GPS receiver portion 5 generates GPS data with a GPS signal received through an antenna and calculates the current position of the portable information terminal unit 1 corresponding to the generated GPS data. In reality, the GPS receiver portion 5 obtains the distance to each of three or more GPS satellites corresponding to the transmission delay time differences of radio wave signals received therefrom and detects the intersection of each spherical surface with the center of each GPS satellite as the absolute position of the user. In such a manner, the GPS data is formed. Corresponding to the GPS data, the current position of the portable information terminal unit 1 is calculated by the calculating process.

The player portion 6 has a record medium such as a semiconductor memory that is attachable thereto and detachable therefrom. The player portion 6 reads music program data from the record medium, decodes the music program data (that has been compression-encoded corresponding to ATRAC method or the like), and generates a reproduced audio signal. The reproduced audio signal is amplified and supplied to a head set or the like. With the head set, the music program is reproduced.

The telephone portion 7 performs a receiving process and a transmitting process in parallel. In the receiving process, the telephone portion 7 performs a frequency converting process and an amplifying process for an RF signal received through the antenna, generates a base-band signal, performs a demodulating process for the received signal, and generates an audio signal. The received audio signal is amplified and supplied to a speaker. In the transmitting process, the telephone portion 7 performs a compression-encoding process for a transmission audio signal received from a microphone, generates audio data, combines the audio data and predetermined control data, obtains transmission data, modulates the transmission data, and generates a base-band transmission signal. Thereafter, the telephone portion 7 performs a frequency converting process and an amplifying process for the obtained base-band signal, generates an RF signal, and transmits the generated RF signal through the antenna.

Figure 1:
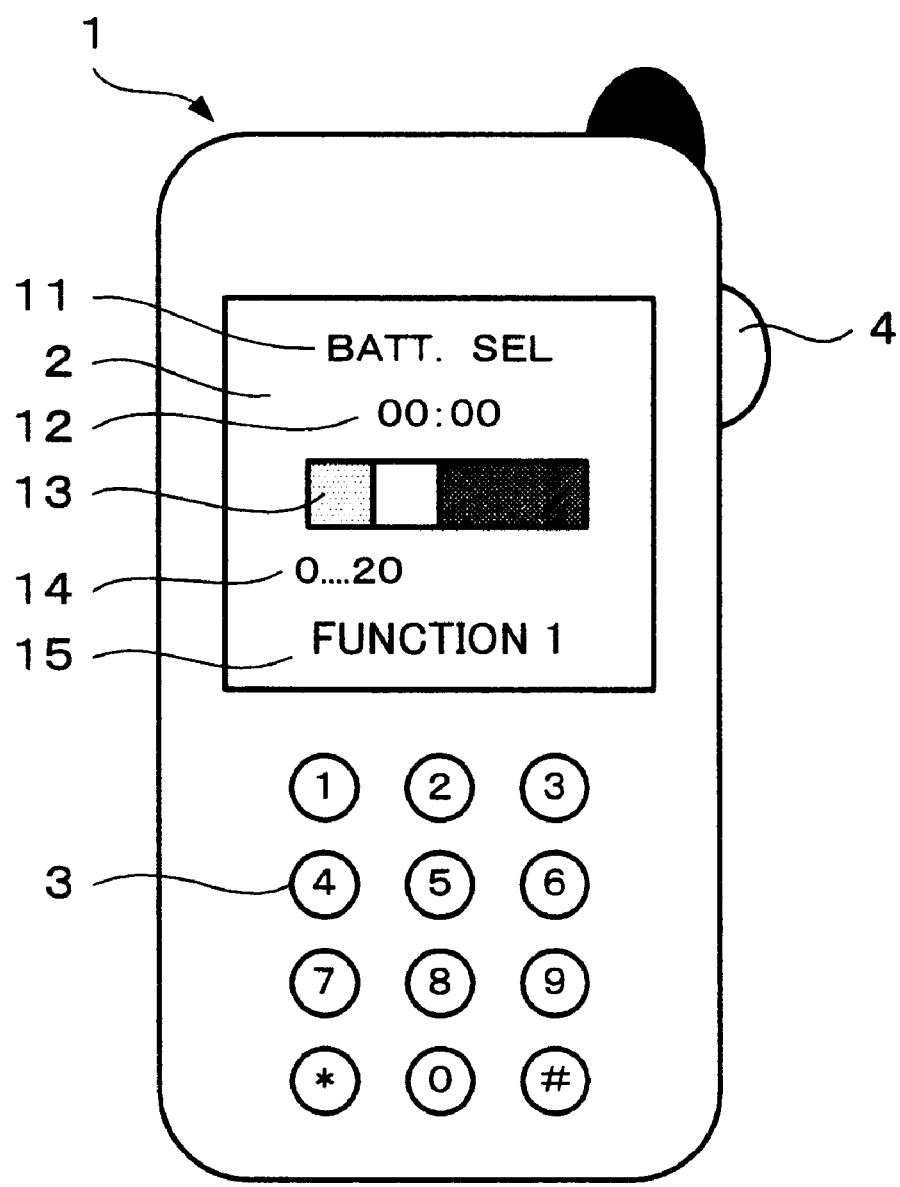
FIG. 1 is an external view for explaining the structure of an embodiment of the present invention.

With the selection dial 4 shown in FIG. 1, the user can designate the GPS function, the player function, or the portable telephone function. When the user designates the GPS function, the GPS receiver portion 5 shown in FIG. 2 operates. Thus, with the GPS function, the current position of the portable information terminal unit 1 can be detected. When the user designates the player function, the player portion 6 operates. Thus, with the portable information terminal unit 1, the user can enjoy a reproduced music program. When the user designates the telephone function, the telephone portion 7 operates. Thus, with the portable information terminal unit 1, the user can send and receive a call to/from a remote party.

Since the portable information terminal unit 1 has a plurality of functions, the user can easily and conveniently use them. In addition, the portable information terminal unit 1 has one battery 8 that supplies a power to the GPS receiver portion 5, the player portion 6, and the telephone portion 7. The battery 8 is a secondary battery such as a nickel cadmium battery, a nickel hydrogen battery, or a lithium ion battery.

Since only one battery 8 supplies a power to the GPS receiver portion 5, the player portion 6, and the telephone portion 7, if the battery is exhausted by one function of the portable information terminal unit 1, the user cannot use another function.

To solve such a problem, the portable information terminal unit 1 according to the present invention has a power supply controlling portion 9. With the power supply controlling portion 9, battery capacities can be assigned to the individual functions. The power supply controlling portion 9 comprises a capacity detecting portion 21, a supplying portion 22, a capacity assigning portion 23, and a supervising portion 24. The capacity detecting portion 21 detects the capacity of the battery 8. The supplying portion 22 supplies the power to the individual functional portions that are the GPS receiver portion 5, the player portion 6, the telephone portion 7, and so forth. The supervising portion 24 supervises the capacity of the battery 8. As will be described later, the structural portions of the power supply controlling portion 9 can be composed by software. With the power supply controlling portion 9, desired battery capacities can be assigned to the individual functional portions as if they have independent batteries.

In other words, when each function is used, if the consumed battery capacity thereof reaches the assigned battery capacity thereof, an alarm portion 10 generates an alarm. Alternatively, the displaying portion 2 displays an alarm message. When the consumed battery capacity of the functional portion exceeds the assigned battery capacity thereof, the power supply to the functional portion is stopped. Thus, since the battery capacities assigned to the other functional portions are not exhausted, when the user wants to use another function, he or she can use it. When the power capacities assigned to the other functions are not exhausted, the user can assign them to his or her desired functional portion. Thus, the battery capacity can be effectively used.

FIG. 3 is a flow chart showing an operation for assigning battery capacities to the individual functions. In FIG. 3, when the selection dial (jog dial) 4 is operated (at step S1), a predetermined mode is selected corresponding to the rotation of the jog dial 4 (at step S2). With the jog dial 4, a battery capacity assigning mode is selected. When the job dial 4 is pressed (at step S3), a battery capacity assigning mode takes place (at step S4).

In the battery capacity assigning mode, as shown in FIG. 1, a mode name that represents that the current mode is "battery capacity assigning mode" is displayed in an area 11 on the top line of the displaying portion 2. A remaining time period is displayed in an area 12. A battery capacity bar is displayed in an area 13. The ratio of a battery capacity assigned to the current function is displayed in an area 14. The current function name is displayed in an area 15.

The battery capacity bar shown in the area 13 represents the battery capacity assigned to the selected function. As shown in FIG. 4, the battery capacity bar has an indication bar A1, an indication bar A2, and an indication bar A3. The indication bar A1 represents a non-assigned state of the battery capacity. The indication bar A2 represents a battery capacity assigned to the selected function. The indication bar A3 represents a battery capacity assigned to the other functions.

When the battery capacity assigning mode is selected, as shown in FIG. 4A, the battery capacity bar for assigning a battery capacity to the function "1" is displayed. Initially, as shown in FIG. 4A, no battery capacities have been assigned to other functions. Thus, the battery capacity bar has only the indication bar A1 that represents the non-assigned state of the battery capacity.

When an increase button (in this example, the "#" button) is pressed, as shown in FIG. 4B, the battery capacity assigned to the function "1" increases. Thus, the indication bar A2 that represents the battery capacity assigned to the function "1" becomes long. On the other hand, when a decrease button (in this example, the "*" button) is pressed, the battery capacity assigned to the function "1" decreases. Thus, the indication bar A2 that represents the battery capacity assigned to the function "1" becomes short. With reference to the battery capacity bar, the user can visually know the battery capacity assigned to the function "1".

After the battery capacity has been assigned to the function "1", a set key (in this example, the "8" key) is pressed. When the set key is pressed, as shown in FIG. 5A, a battery capacity bar for assigning a battery capacity to the function "2" is displayed.

At this point, since a battery capacity has been assigned to the function "1", all the capacity of the battery 8 cannot be assigned to the function "2". In addition, as shown in FIG. 5A, the battery capacity bar has the indication bar A3 that represents the battery capacity assigned to another function (in this example, the function "1").

When the increase button is pressed, as shown in FIG. 5B, the battery capacity assigned to the function "2" increases. Thus, the indication bar A2 that represents the battery capacity assigned to the function "2" becomes long. On the other hand, when the decrease button is pressed, the battery capacity assigned to the function "2" decreases. Thus, the indication bar A2 that represents the battery capacity assigned to the function "2" becomes short.

After a battery capacity has been assigned to the function "2", the set key is pressed. When the set key is pressed, as shown in FIG. 6A, a battery capacity bar for assigning a battery power to the function "3" is displayed.

At this point, since battery capacities have been assigned to the functions "1" and "2", all the capacity of the battery 8 cannot be assigned to the function "3". As shown in FIG. 6A, the battery capacity bar has the indication bar A3 that represents battery capacities assigned to the other functions (in this example, the functions "1" and "2").

When the increase button is pressed, as shown in FIG. 6B, the battery capacity assigned to the function "3" increases. Thus, the indication bar A2 that represents the battery capacity assigned to the function "3" becomes long. On the other hand, when the decrease button is pressed, the battery capacity assigned to the function "3" decreases. Thus, the indication bar A2 that represents the battery capacity assigned to the function "3" becomes short.

Figure 7A:
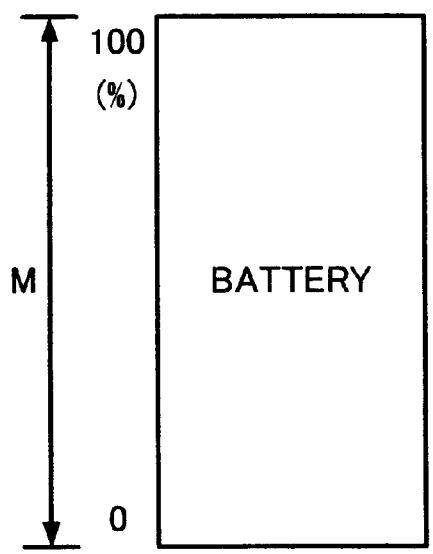
FIGS. 7A and 7B are schematic diagrams for explaining the assigning operation for battery capacities.
Figure 7B:
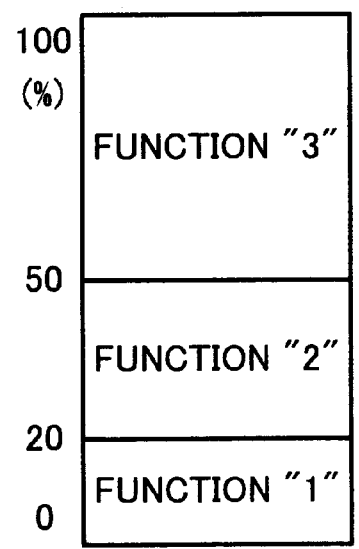

In such a manner, the capacity of one battery can be assigned to a plurality of functions. In other words, as shown in FIG. 7A, assuming that there is a battery with a battery capacity of M, as shown in FIG. 7B, for example, 20%, 30%, and 50% of the capacity of the battery can be assigned to the function "1", the function "2", and the function "3", respectively. The assigned battery capacities are supervised. The user is notified of the remaining capacities of the battery capacities assigned to the functions. Thus, all the capacity of the battery 8 can be more effectively and rationally used.

Figure 8:
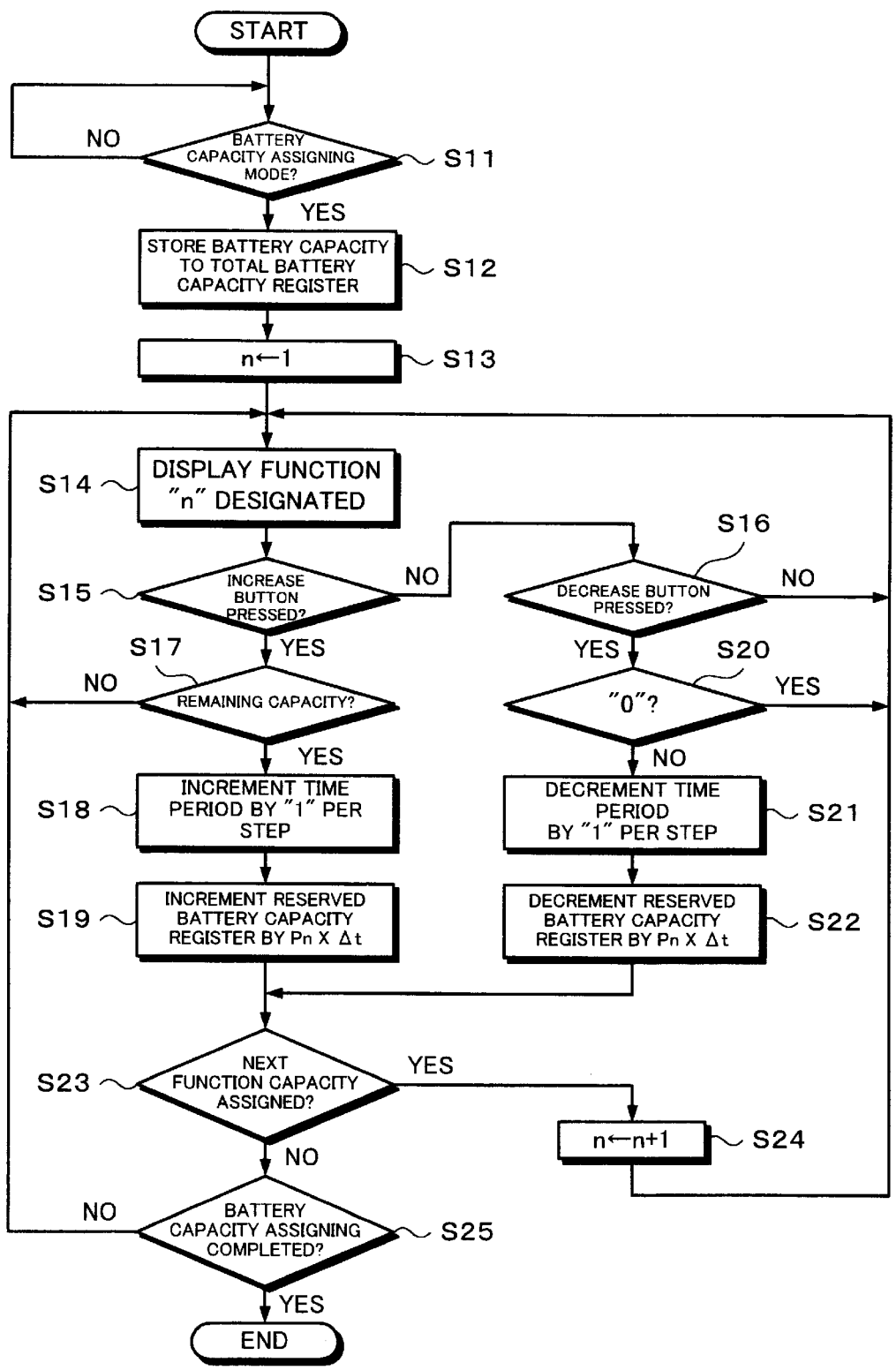
FIG. 8 is a flow chart for explaining the assigning process for battery capacities according to the embodiment of the present invention.

FIG. 8 is a flow chart showing a process for designating the battery capacity assigning mode. In this example, the following registers are used.

Total battery capacity register: a register for storing the value corresponding to the total capacity of the battery.

Reserved battery capacity register: a register for storing the value corresponding to battery capacities reserved for other functions.

Function "n" assigned battery capacity register: a register for storing the value corresponding to a time period equivalent to a battery capacity assigned to the function "n".

When the functional portion corresponding to the function "n" operates, the MSB (Most Significant Bit) of the function "n" assigned battery capacity register is "1". In other words, when the GPS receiver portion 5 operates, the MSB of the function "1" assigned battery capacity register is "1". When the player portion 6 operates, the MSB of the function "2" assigned battery capacity register is "1". When the telephone portion 5 operates, the MSB of the function "3" assigned battery capacity register is "1".

In addition, the current consumption per unit time period of each function is pre-obtained. The current consumption per unit time period of each function is denoted by Pn. In other words, the current consumption per unit time period Δt of the GPS receiver portion 5 that accomplishes the function "1" is P1. The current consumption per unit time period Δt of the player portion 6 that accomplishes the function "2" is P2. The current consumption per unit time period Δt of the telephone portion 7 that accomplishes the function "3" is P3.

In FIG. 8, it is determined whether or not the battery capacity assigning mode has taken place (at step S11). When the determined result at step S11 is Yes (namely, the battery capacity assigning mode has taken place), the value corresponding to all the capacity of the battery is stored to the total battery capacity register (at step S12).

All the capacity of the battery is detected by for example detecting a drop of a terminal voltage due to a variation of the internal resistance of the battery or a current due to a variation of a terminal voltage. The battery capacity may be detected in various manners. The optimum detecting method for detecting the battery capacity depends on the type of the battery for use. According to the present invention, the detecting method of the battery capacity is not limited.

After the value corresponding to all the capacity of the battery has been stored, the function number "n" is initialized to "1" (at step S13). Thereafter, an indication that represents that the function "1" has been designated is displayed on the displaying portion 2 (at step S14). At this point, the power capacity bar as shown in FIG. 4A is displayed. Thereafter, the battery capacity of the function "1" is assigned.

Thereafter, it is determined whether or not the assigning value increase button ("#" key) has been pressed (at step S15). When the determined result at step S15 is No (namely, the assigning value increase button has not been pressed), it is determined whether or not the assigning value decrease button ("*" key) has been pressed (at step S16).

When the determined result at step S15 is Yes (namely, the assigning value increase button has been pressed), it is determined whether or not there is a remaining capacity in the battery (at step S17). The remaining battery capacity is obtained by subtracting the value stored in the reserved battery capacity register from the value stored in the total battery capacity register. When the battery does not have a remaining battery capacity, the flow returns to step S14. When the determined result at step S17 is Yes (namely, the battery has a remaining battery capacity), the value stored in the function "1" assigned battery capacity register increments by "1" per step. In this example, one step is equivalent to a unit time period $\Delta t$. The value stored in the function "1" assigned battery capacity register increments corresponding to the number of times of the operation of the assigning value increase button and the time period for which the button is pressed.

After the value stored in the function "1" assigned battery capacity register increments by "1" per step, the value stored in the reserved battery capacity register increments by ($Pn \times \Delta t$) per step (at step S19). In other words, the time period for the battery capacity used for the function "n" is stored to the function "n" assigned battery capacity register in the unit time period $\Delta t$ per step. Since the current consumption in the unit time period $\Delta t$ of the function "n" is Pn, the battery capacity to convert the value of the time period into the value of the battery capacity, the current consumption Pn is multiplied by $\Delta t$. Thus, the value stored in the reserved battery capacity register increments by ($Pn \times \Delta t$) per step. The battery capacity equivalent to the time period corresponding to the value stored in the function "n" assigned battery capacity register is stored to the reserved battery capacity register.

When the determined result at step S16 is Yes (namely, the assigning value decrease button has been pressed), it is determined whether or not the value stored in the function "1" assigned battery capacity register is "0" (at step S20). When the determined result at step S20 is Yes (namely, the value stored in the function "1" assigned battery capacity register is "0"), since the battery capacity cannot be decreased, the flow returns to step S14. When the determined result at step S20 is No (namely, the value stored in the function "1" assigned battery capacity register is not "0"), the value stored in the function "1" assigned battery capacity register decrements by "1" per step (at step S21).

After the value stored in the function "1" assigned battery capacity register has decremented by "1" per step, the value stored in the reserved battery capacity register decrements by ($Pn \times \Delta t$) per step (at step S22).

When the determined result at step S15 is Yes (namely, the assigning value increase button has been pressed), the value stored in the function "1" assigned battery capacity register increments by "1" per step. Thereafter, when the determined result at step S16 is Yes (namely, the assigning value increase button has been pressed), the value stored in the function "1" assigned battery capacity register decrements by "1" per step. Thus, the time period equivalent to the battery capacity assigned to the function "1" increases or decreases. As a result, the battery capacity has been assigned to the function "1". At steps S19 and S22, the value corresponding to the battery capacity equivalent to the time period of the battery capacity assigned to the function "1" is stored to the reserved battery capacity register.

After the battery capacity has been assigned to the function "1" at step S19 or S22, it is determined whether or not a battery capacity is assigned to the next function (function "2") (at step S23). When the determined result at step S23 is Yes (namely, a battery capacity is assigned to the next function), the function number n increments by "1" (at step S24). Thereafter, the flow returns to step S14.

When the determined result at step S23 is No (namely, a battery capacity is not assigned to the next function), it is determined whether or not the storage capacity assigning mode is completed (at step S25). When the determined result at step S25 is No (namely, the storage capacity assigning mode is not completed), the flow returns to step S14.

When the determined result at step S23 is Yes (namely, a battery capacity is assigned to the next function), the flow advances to step S24. At step S24, the function number n increments by "1". Since the current function number is "1", the function number becomes "2". As described above, in the loop from step S14 to step S22, the time period equivalent to the battery capacity for the function "2" is assigned. The total capacity of the battery capacity assigned to the function "2" and the battery capacity assigned to the function "1" is stored to the reserved battery capacity register.

Thereafter, the similar process is repeated. The values corresponding to the time periods equivalent to the battery capacities assigned to the function "1", the function "2", and the function "3" are stored to the function "n" assigned battery capacity registers. In addition, the value corresponding to the total battery capacity assigned to the function "1", the function "2", and the function "3" is stored to the reserved battery capacity register.

After battery capacities have been assigned to all the functions, the determined results at steps S23 and S25 become No. Thus, a battery capacity is not assigned to the next function and the battery capacity assigning process is completed.

After battery capacities have been assigned to all the functions, the value corresponding to the total battery capacity is stored to the total battery capacity register. The value corresponding to the reserved battery capacity is stored to the reserved battery capacity register. The values corresponding to the time periods equivalent to the battery capacities assigned to the functions are stored to the function "n" assigned battery capacity registers.

Figure 9:
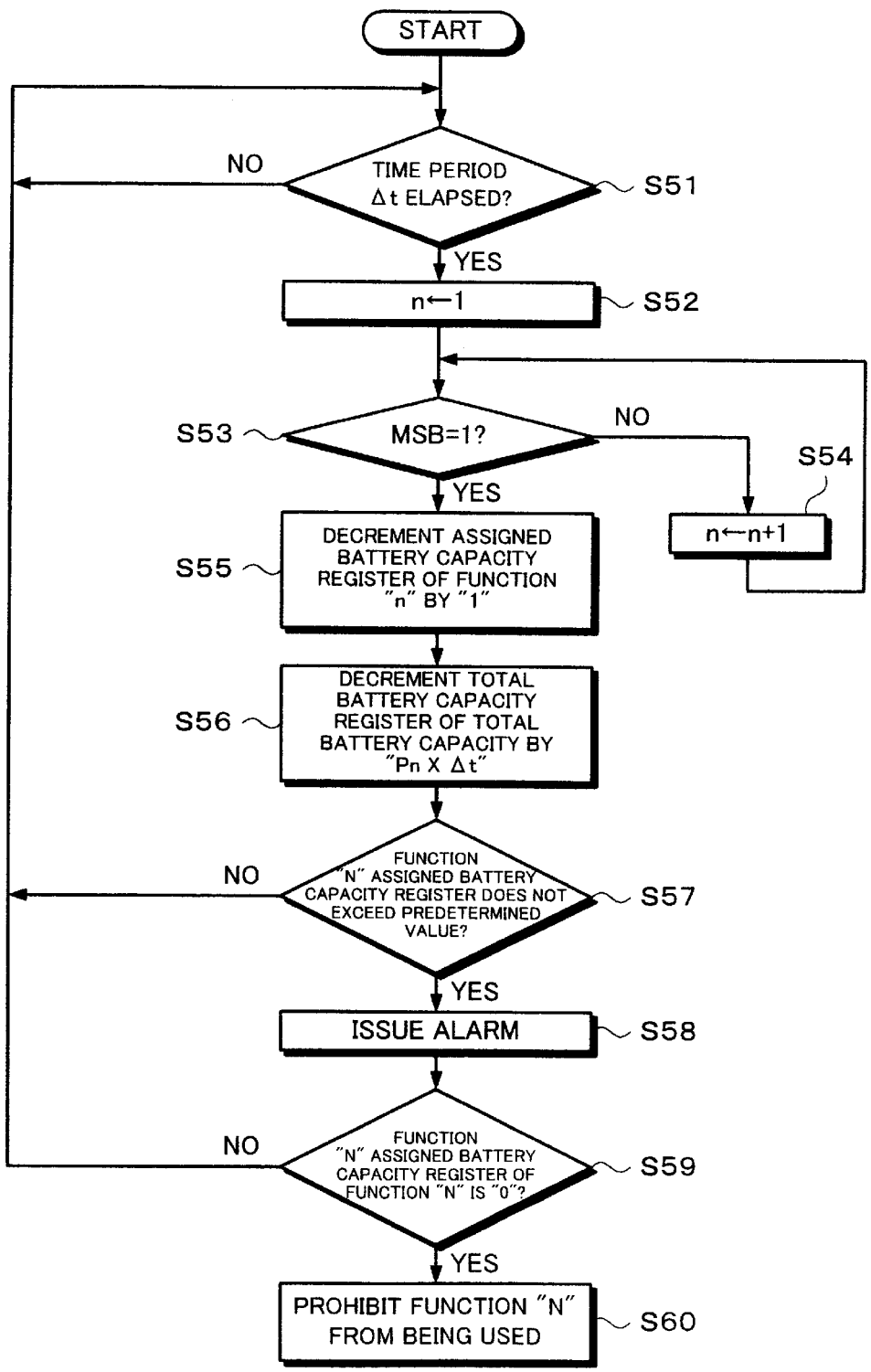
FIG. 9 is a flow chart for explaining the assigning process for battery capacities according to the embodiment of the present invention in the case that the unit is being operated.

FIG. 9 shows a process performed when the unit is used. In FIG. 9, it is determined whether or not a predetermined time period $\Delta t$ has elapsed (at step S51). When the determined result at step S51 is Yes (namely, a predetermined time period $\Delta t$ has elapsed) the function number "n" is initialized to "1" (at step S52). Thereafter, it is determined whether or not the MSB of the function "n" assigned battery capacity register is "1" (at step S53). When the determined result at step S53 is No (namely, the MSB of the function "n" assigned battery capacity register is not "1"), the function number "n" increments (at step S54). Thereafter, the flow returns to step S53.

As was described above, when the function corresponding to the function "n" assigned battery capacity register operates, the MSB thereof is "1". In other words, when the GPS receiver portion 5 operates, the MSB OF the function "1" assigned battery capacity register is "1". When the player portion 6 operates, the MSB OF the function "2" assigned battery capacity register is "1". When the GPS receiver portion 5 operates, the MSB OF the function "3" assigned battery capacity register is "1". Thus, since the "n" function assigned battery capacity register whose MSB is "1" is detected at step S53, the function corresponding thereto can be detected.

After the function "n" assigned battery capacity register whose MSB is "1" has been detected at step S53, the value stored in the function "n" assigned battery capacity register decrements by "1" (at step S55). Thereafter, the value stored in the total battery capacity register decrements by "Pn×Δt" (at step S56). The value stored in the total battery capacity register decrements by "Pn×Δt" because a time period as a value stored in the function "n" assigned battery capacity register should be converted into a battery capacity as a value stored in the total battery capacity register.

Thereafter, it is determined whether the value stored in the function "n" assigned battery capacity register does not exceed a predetermined value (at step S57). When the determined result at step S57 is No (namely, the value stored in the function "n" assigned battery capacity register exceeds the predetermined value), the flow returns to step S51.

In such a manner, the value stored in the function "n" assigned battery capacity register decrements by "1" at intervals of a predetermined time period Δt at step S55. The function "n" assigned battery capacity register stores a value corresponding to a time period equivalent to a battery capacity assigned to the function "n". Thus, as the operation time of the function elapses, the value stored in the function "n" assigned battery capacity register decreases.

When the determined result at step S57 is Yes (namely, the value stored in the function "n" assigned battery capacity register does not exceed the predetermined value), an alarm that represents that the time period equivalent to the battery capacity assigned to the function will elapse soon is generated (at step S58). This alarm may be generated by the speaker as an audio alarm or displayed by the displaying unit as an alarm message.

Thereafter, it is determined whether or not the value stored in the function "n" assigned battery capacity register is "0" (at step S59). When the value stored in the function "n" assigned battery capacity register is "0", the time period equivalent to the battery capacity assigned to the function has elapsed. When the determined result at step S59 is No (namely, the value stored in the function "n" assigned battery capacity register is not "0"), the flow returns to step S51. When the determined result at step S59 is Yes (namely, the value stored in the function "n" assigned battery capacity register is "0"), the power supplied to the functional portion corresponding to the function "n" is stopped (at step S60).

In the above-mentioned embodiment, the portable telephone unit having the GPS function, the player function, and the telephone function was described. However, it should be noted that the present invention can be readily applied to a portable electronic unit having two or more functions other than the above-mentioned functions.

According to the present invention, battery capacities can be freely assigned to a plurality of functions of the unit. In addition, since the battery capacities assigned to the individual functions are always supervised and a message corresponding to a remaining battery capacity is issued to the user, all the capacity of the battery can be more effectively and rationally used. When a battery capacity assigned to one function remains, it can be assigned to another function. Thus, all the capacity of the battery can be effectively used. In addition, since a battery capacity can be freely assigned to a function designated by the user, the operability of the unit is improved.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A power supply apparatus for supplying power from a battery to a plurality of functional blocks of an electronic device, comprising:

battery capacity assigning means for assigning respective battery capacities to the plurality of functional blocks; and battery capacity managing means for managing the battery capacities of the plurality of functional blocks corresponding to the battery capacities assigned to the plurality of functional blocks.

2. The power supply apparatus as set forth in claim 1, wherein said battery capacity managing means includes means for supervising remaining battery capacities assigned to the plurality of functional blocks and for issuing an alarm when remaining battery capacities assigned to the plurality of functional blocks are equal to or smaller than respectively designated values.

3. The power supply apparatus as set forth in claim 1, further comprising:

means for stopping supplying the power to a predetermined one of the plurality of functional blocks when a remaining battery capacity assigned to the predetermined functional block is equal to or smaller than a designated value.

4. A power supply controlling method for supplying power from a battery to a plurality of functional blocks of an electronic device, comprising the steps of:

assigning battery capacities to the plurality of functional blocks; and managing the battery capacities of the plurality of functional blocks corresponding to the battery capacities assigned to the plurality of functional blocks.

5. The power supply controlling method as set forth in claim 4, wherein said step of managing is performed by supervising remaining battery capacities assigned to the plurality of functional blocks and issuing an alarm when the remaining battery capacities assigned to the plurality of functional blocks are equal to or smaller than respectively designated values.

6. The power supply controlling method as set forth in claim 4, further comprising the step of:

stopping supplying the power to a predetermined one of the plurality of functional blocks when a remaining battery capacity assigned to the predetermined functional block becomes equal to or smaller than a designated value.

* * * * *